US008103380B2

(12) United States Patent
Cheng et al.

(10) Patent No.: US 8,103,380 B2
(45) Date of Patent: Jan. 24, 2012

(54) REMOTE MANAGEMENT OF VENDING MACHINES

(75) Inventors: Fred Cheng, Aliso Viejo, CA (US); Mandeep S. Arora, Danville, CA (US); Anant Agrawal, Diamond Bar, CA (US); A. Louis Beaudoin, Oakland, CA (US); Eric M. Chu, Laguna Niguel, CA (US)

(73) Assignee: Cantaloupe Systems, Inc., Berkeley, CA (US)

( * ) Notice: Subject to any disclaimer, the term of this patent is extended or adjusted under 35 U.S.C. 154(b) by 126 days.

(21) Appl. No.: 11/097,761

(22) Filed: Mar. 31, 2005

(65) Prior Publication Data

US 2006/0219517 A1 Oct. 5, 2006

(51) Int. Cl.
*G06F 17/00* (2006.01)

(52) U.S. Cl. .......................... 700/244; 700/236; 700/240

(58) Field of Classification Search .................. 700/236, 700/241, 244

See application file for complete search history.

(56) References Cited

U.S. PATENT DOCUMENTS

| | | | | |
|---|---|---|---|---|
| 5,159,560 | A * | 10/1992 | Newell et al. | 700/241 |
| 5,464,087 | A * | 11/1995 | Bounds et al. | 194/200 |
| 5,959,869 | A | 9/1999 | Miller et al. | |
| 6,038,491 | A | 3/2000 | McGarry et al. | |
| 6,230,150 | B1 * | 5/2001 | Walker et al. | 700/241 |
| 6,339,731 | B1 * | 1/2002 | Morris et al. | 700/236 |
| 6,457,038 | B1 | 9/2002 | Defosse | |
| 6,505,095 | B1 * | 1/2003 | Kolls | 700/244 |
| 6,628,764 | B1 * | 9/2003 | Petite | 700/236 |
| 6,741,910 | B1 | 5/2004 | Yamazaki | |
| 6,839,610 | B2 * | 1/2005 | Carstens et al. | 700/236 |
| 2002/0156727 | A1 | 10/2002 | LeVake et al. | |
| 2003/0101257 | A1 | 5/2003 | Godwin | |
| 2003/0158625 | A1 | 8/2003 | Carstens et al. | |
| 2004/0114557 | A1 | 6/2004 | Bryan et al. | |
| 2004/0133653 | A1 | 7/2004 | Defosse et al. | |

OTHER PUBLICATIONS

Kasavana, Michael L., "NAMA White Paper: Cashless Vending," The National Automatic Merchandising Association, 40 pages.

* cited by examiner

*Primary Examiner* — Timothy Waggoner

(74) *Attorney, Agent, or Firm* — Haynes and Boone, LLP

(57) ABSTRACT

Systems and methods for remotely managing a vending machine system are provided. A host system transmits control data to an audit system installed in a vending machine system. This control data is used to modify a data collection parameter of the audit system, such as modifying alert conditions, reporting schedules, and filter terms used to parse DEX files received from a vending machine controller.

30 Claims, 5 Drawing Sheets

| MachineTypes | | | | |
|---|---|---|---|---|
| ID | Manufacturer | Model | Version | ErrorCodeSet |
| 1000 | Manufacturer A | Model A1 | 2.00 | 1000 |
| 1003 | Manufacturer A | Model A1 | 1.00 | |
| 1004 | Manufacturer B | Model B1 | 4.11 | |
| 1005 | Manufacturer C | Model C1 | 5.09 | 1001 |
| 1006 | Manufacturer C | Model C1 | 5.05 | 1001 |
| 1008 | Manufacturer D | Model D1 | All | 1002 |

FIG. 4A

| ErrorCodeDeviceWatchList | | | | | |
|---|---|---|---|---|---|
| ID | ErrorCodeSet | BeginsWith | Contains | EndsWtih | Ignore |
| 1 | 1002 | EA2*HSMP | | | FALSE |
| 2 | 1002 | EA2*HSLS | | | FALSE |
| 3 | 1002 | EA1*SOVR | | | FALSE |
| 4 | 1002 | EA1*SMPT | | | FALSE |
| 5 | 1002 | EA1*HTDS | | | FALSE |
| 6 | 1002 | EA1*UVLF | | | FALSE |
| 7 | 1002 | EA2*LLF | | | FALSE |
| 8 | 1002 | EA1*HLTF | | | FALSE |
| 9 | 1002 | EA1*TEST | | | FALSE |

FIG. 4B

| ErrorCodeTranslations | | | | |
|---|---|---|---|---|
| ID | Error Code Set | DexMatch | EnglishTranslation | Urgency |
| 1 | 1000 | EA1*4 | Oven Over Temperature. Fault Code 4. | 1 |
| 3 | 1000 | EA1*6 | Carousel Fault. Fault Code 6. | 1 |
| 4 | 1000 | EA1*7 | Freezer door fault. Fault Code 7. | 1 |
| 5 | 1000 | EA1*8 | Magazine release fault. Fault Code 8. | 1 |
| 6 | 1000 | EA1*10 | Oven door fault. Fault Code 10. | 1 |
| 7 | 1000 | EA1*11 | Microwave fault. Fault Code 11. | 1 |
| 8 | 1000 | EA1*12 | Power down in vend. Fault Code 12. | 1 |
| 9 | 1000 | EA1*13 | No magazine assignment. Fault Code 13. | 1 |
| 10 | 1000 | EA1*14 | No Sel Key Assignment. Fault Code 14. | 1 |
| 13 | 1000 | EA1*15 | No Inventory to Vend. Fault Code 15. | 1 |
| 14 | 1000 | EA1*16 | No Sel Key - program. Fault Code 16. | 1 |
| 15 | 1000 | EA1*17 | Coin Mechanism fault. Fault Code 17. | 1 |
| 16 | 1000 | EA1*19 | Lost vacuum fault. Fault Code 19. | 1 |
| 17 | 1000 | EA1*20 | Package didn't drop fault. Fault Code 20. | 1 |
| 18 | 1000 | EA1*21 | Pkg not delivered fault. Fault Code 21. | 1 |
| 19 | 1000 | EA1*23 | Block Suction/Ram fault. Fault Code 23. | 1 |
| 20 | 1000 | EA1*25 | Transfer Ram fault. Fault Code 25. | 1 |
| 21 | 1000 | EA1*26 | Freezer over temp fault. Fault Code 26. | 1 |
| 22 | 1000 | EA1*28 | Burn in fault. Fault Code 28. | 1 |
| 23 | 1000 | EA1*30 | Cook time too long. Fault Code 30. | 1 |
| 24 | 1001 | MA5 | Error detected by Machine: {1} | 1 |
| 25 | 1002 | EA2*HSMP | High Sump | 1 |
| 26 | 1002 | EA2*HSLS | High/Low Sump Fault | 1 |
| 27 | 1002 | EA1*SOVR | Sump Overflow. Dex Date: {2} Time: {3} | 1 |
| 28 | 1002 | EA1*SMPT | Sump Timeout. Dex Date: {2} Time: {3} | 1 |
| 29 | 1002 | EA1*HTDS | High TDS. Dex Date: {2} Time: {3} | 1 |
| 30 | 1002 | EA1*UVLF | UV Lamp Failure. Dex Date: {2} Time: {3} | 1 |
| 31 | 1002 | EA2*LLF | Low Level Fault | 1 |
| 32 | 1002 | EA1*HLTF | High/Low Tank Fault. Dex Date: {2} Time: {3} | 1 |
| 34 | 1002 | EA1*TEST | Cantaloupe Test Code. Dex Date: {2:d} Time: {3:t} | 1 |

FIG. 4C

REMOTE MANAGEMENT OF VENDING MACHINES

BACKGROUND

Vending machines have long been used for selling products to consumers. In the past, vending machine managers needed to send human operators to personally visit each vending machine in order to check on the status of the vending machine, to retrieve the collected cash, and to restock the vending machine with new products to replace the products that had been sold. Recently, these vending machines have been provided with electronic vending machine controllers (VMC), which control the operation of various components within the vending machine. In addition to providing control functionality, the VMC may also serve as a monitoring system for monitoring the status of the vending machine and for keeping track of product sales, inventory, and cash flow.

Even more recently, vending machines have been provided with audit systems capable of retrieving information regarding the status of the vending machine and transmitting the data to a central server, where the data can be processed and analyzed. This can assist the vending machine operator in scheduling service visits to the vending machine location. In many cases, existing vending machines are retrofitted with these types of audit systems, which retrieve the information regarding the vending machine from the VMC.

The National Automatic Merchandising Association (NAMA) has established a communication protocol for the electronic retrieval of machine-level transactions via data polling. This communication protocol is known as the Data Exchange Uniform Code Standard (DEX/UCS), typically referred to as DEX. The DEX protocol establishes standards governing data recordation, file formatting, and file exportation through common interfaces. Current vending machines are typically manufactured to communicate using the DEX protocol and are sometimes referred to as "DEX-compliant." DEX reporting provides a vending machine operator the ability to track brand and/or product preferences at the point of purchase, and can improve sales performance, reduce operating expenses, and minimize machine malfunctions.

Despite the advances in monitoring technology for vending machines, these audit systems are typically focused on merely retrieving information about the vending machine and transmitting that information to the host system. As a result, vending machine operators still typically visit the vending machines in order to make configuration adjustments, update software and hardware, and to install new peripheral devices in the vending machine.

Accordingly, it would be desirable to provide a vending machine audit system that improves an operator's ability to remotely control vending machine systems.

SUMMARY

In accordance with embodiments of the present invention, systems and methods for remotely managing a vending machine system are provided. A host system transmits control data to an audit system installed in a vending machine system. This control data is used to modify a data collection parameter of the audit system, such as modifying alert conditions, reporting schedules, and filter terms used to parse DEX files received from a vending machine controller.

In accordance with embodiments of the present invention, a method of operating a vending machine system comprising a vending machine controller (VMC) and an audit system is provided, comprising: receiving control data from a host via a wide area network, wherein the control data comprises a command to modify a data collection parameter of the audit system; and in response to the command, using the audit system to collect data according to the modified data collection parameter.

In accordance with embodiments of the present invention, a method of operating a vending machine system comprising a vending machine controller (VMC) and an audit system is provided, comprising: receiving control data from a host via a wide area network, wherein the control data comprises code for execution by the audit system for interfacing with a device contained in the vending machine system; and storing the code in a nonvolatile memory of the audit system.

In accordance with embodiments of the present invention, an audit system for a vending machine system is provided, comprising: a communications interface for receiving data over a wide area network (WAN); and an audit control system configured to receive control data from the communications interface, wherein the control data comprises a command to modify a data collection parameter of the audit system, said audit control system being configured to collect data from a vending machine controller (VMC) according to the modified data collection parameter.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims of the issued patent.

DESCRIPTION OF THE DRAWINGS

FIGS. 4A-4C show exemplary tables used for managing status code management lists, in accordance with embodiments of the present invention.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
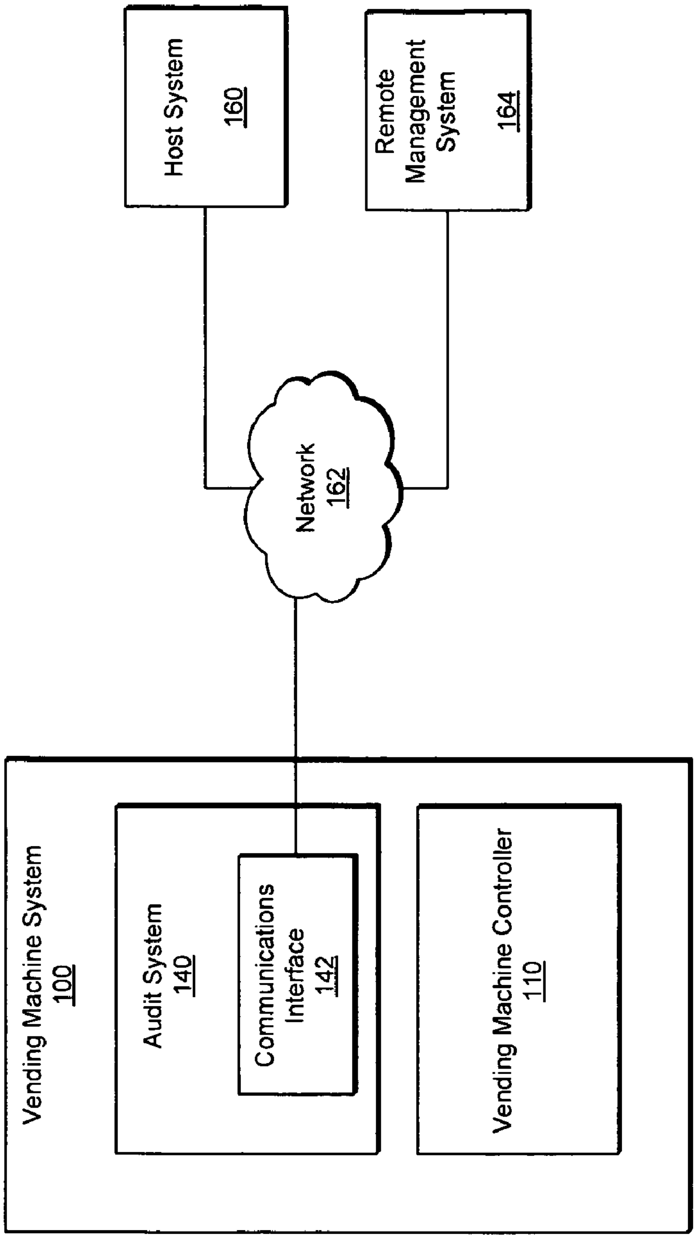
FIG. 1 is a block diagram of an arrangement for remotely controlling a vending machine system, in accordance with embodiments of the present invention.

FIG. 1 is a block diagram of an arrangement for remotely controlling a vending machine system, in accordance with embodiments of the present invention. A vending machine system 100 is coupled to a host system 160 via a wide area network 162, such as the Internet. The vending machine system 100 comprises a vending machine controller (VMC) 110 and an audit system 140. The audit system 140 includes a communications interface 142 which provides a communications link to the network 162 and allows the audit system 140 to transmit operational data regarding the vending machine system 100 to the host system 160. This communications link may comprise, e.g., a wireless communications link. A remote management system 164 may also be provided to allow a user to access the operational data regarding the vending machine on host system 160 and to manage the operation of the vending machine system 100.

Figure 2:
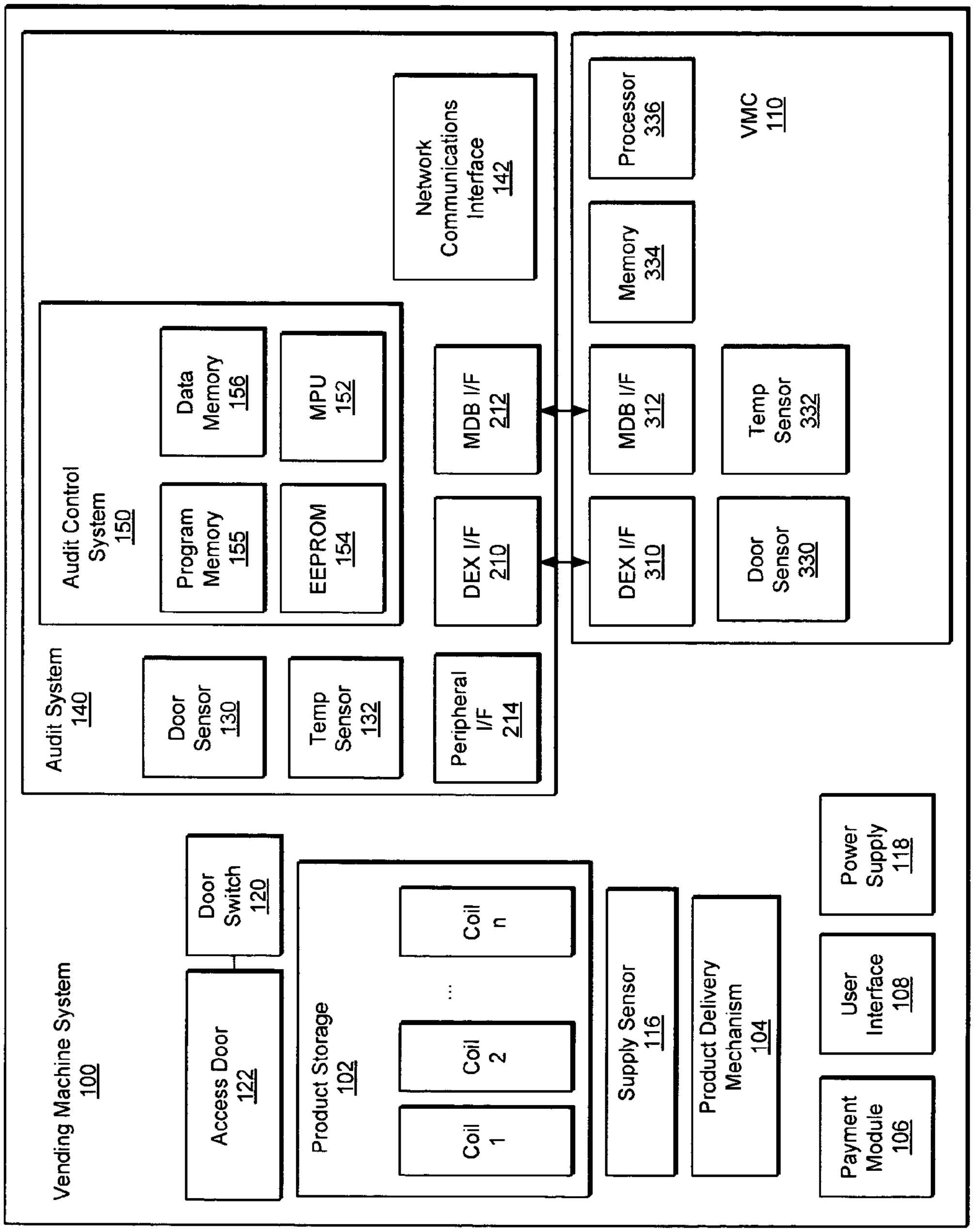
FIG. 2 is a more detailed block diagram of the vending machine system, in accordance with embodiments of the present invention.

FIG. 2 is a more detailed block diagram of the vending machine system 100, in accordance with embodiments of the present invention. The vending machine system 100 includes a product storage portion 102, which stores the various types of products to be sold by the vending machine system 100 in one or more product storage compartments. These product storage compartments are sometimes referred to as "coils", in reference to the coil-shaped wire often used in conventional vending machines to control the delivery of products to customers.

The vending machine system 100 also includes a payment module 106, which may be configured to receive payment from a user in various forms, including, e.g., bills, coins, credit card, debit card, smartcard, wireless authorization (e.g., via cell phone), or the like. A user interface 108 is provided for allowing a user to make product selections. Typically, the user interface 108 will include a plurality of buttons, each button corresponding to a particular type of product available for sale. In other embodiments, the user interface 108 will include a keypad or touchscreen for entering product selections. The payment module 106 and user interface 108 are coupled to the VMC 110, which controls the operation of the vending machine system 100. During normal use, when a user has provided sufficient payment via the payment module 106 and makes a product selection via the user interface 108, the VMC 110 activates a product delivery mechanism 104, which retrieves the selected product from the appropriate product storage compartment and delivers the product to the user. One or more supply sensors 116 may be provided for monitoring the supply of products in the various coils. These supply sensors 116 may be configured to monitor the exact amount of product in each coil, to monitor when the supply of product in each coil reaches one or more predetermined monitoring levels (e.g., a restock warning level and an empty level), or to monitor when the supply of product in each coil is completely exhausted.

The vending machine 100 includes an access door 122 which is used by service personnel to restock the product storage portion 102, retrieve money from the payment module 106, download system and sales information from the VMC 110, make repairs, and perform other service-related duties. A door switch 120 engages the access door 122 such that the VMC 110 can detect when the access door 122 is opened.

The VMC 110 is configured to poll the various devices provided in the vending machine system 100 in order to determine the status of the system. For example, the VMC 110 continuously polls the payment module 106 to determine whether any money has been inserted into the system 100. When a customer inserts money into the payment module 106, the payment module 106 will respond to the VMC's polling with a message indicating the amount of money received. Once the appropriate amount of money is received from the customer and a selection is entered into the user interface 108, the processor 336 instructs the product delivery mechanism 104 to deliver the product corresponding to the customer's selection. The amount of cash received, the amount of change returned to the customer, and the product vended are stored in the memory 334 of the VMC 110. Thus, the VMC 110 is able to maintain a record of vending machine operational data, e.g. sales and cash.

In accordance with embodiments of the present invention, an audit system 140 is provided for monitoring the vending machine system 100. Although the audit system 140 may be provided as an integral component of the vending machine system 100, in many cases, the audit system 140 is a separate device that can be installed in an existing vending machine system 100. The audit system 140 comprises one or more interfaces for coupling the audit system 140 to other devices. This can be accomplished using, e.g., a serial interface, such as a DEX or MDB port, that communicates using a standard data protocol, such as DEX/UCS or MDB/ICP.

In the embodiment shown, the audit system 140 comprises a DEX interface 210 and a MDB interface 212, which couple to a corresponding DEX interface 310 and MDB interface 312 on the VMC 110. The DEX interface 210 comprises an interface which allows the coupled devices to communicate according to the DEX/UCS protocol. The physical connection provided by the DEX interface 210 may comprise a ¼ inch female socket. In this embodiment, the audit system 140 uses the DEX interface 210 to transmit and receive messages regarding operational data from the VMC 110. This may include requesting and receiving DEX files, as will be described in greater detail below.

The MDB interface 212 is an interface that complies with the standard established as the Multi-Drop Bus/Internal Communication Protocol (MDB/ICP), which is a serial bus interface for electronically controlled vending machines. The illustrated audit system 140 may use the MDB interface 212 to receive power from the power supply 118 via the VMC 110 and to interface with peripheral devices coupled to the VMC 110.

The audit system 140 may also be provided with a peripheral interface 214 for directly coupling the audit system 140 to peripheral devices without utilizing the VMC 110. This peripheral interface to 14 may comprise, e.g., a serial interface, such as the I2C interface.

The audit system 140 may also include a door sensor 130, which is used to detect the state of the access door 122 for the vending machine system 100, and a temperature sensor 132, which is used to detect the temperature within the vending machine system 100 and/or within the product storage portion 102. The VMC 110 may also include separate a door sensor 330 for detecting the state of the access door 122 and a temperature sensor 332 for detecting the vending machine system 100. The redundant door and temperature sensors may be desirable if the audit system 140 requires a higher level of sensitivity or reliability in its sensors 130, 132 than the existing sensors 330, 332 provided by the VMC 110. In addition, some retrofitted audit systems 140 may have difficulty retrieving door sensor and temperature sensor information from some vending machine controllers which are unresponsive to standard commands requesting door and temperature information.

The audit system 140 also comprises an audit control system 150, which implements the control logic for operation of the audit system 140. The audit control system 150 comprises a processor, shown as MPU 152, which can be, e.g., an AVR ATmega128 microcontroller by the Atmel Corporation of San Jose, Calif. The audit control system 150 may also be provided with one or more memory devices. In the embodiment shown, the audit control system 150 comprises an EEPROM 154, a flash memory 155, and a data memory 156. The EEPROM 154 may be used to store settings for the operational parameters of the audit system 140. The flash memory 155 may be used to store program data for execution by the MPU 152. The data memory 156 may comprise an SRAM memory for storing operational data retrieved from the VMC 110. In the AVR ATmega128 microcontroller, these memory devices are incorporated into the microcontroller. In other systems, the memory devices may be provided in separate devices.

The audit system 140 also comprises a communications interface 142 for coupling the audit system 140 to the network 162. The communications interface 142 may comprise any of a variety of types of communication interfaces, both wired and wireless. A wired interface may comprise any of a variety of well-known interfaces for coupling to wide-area networks via a wire, cable, fiber-optic, or other physical media for transmitting analog or digital data. A wireless interface may comprise any of a variety of well-known interfaces for establishing a wireless link to a wide-area network. The wireless interface may comprise a long-range wireless interface, such as a radio frequency (RF) modem for transmitting data using a variety of communication protocols, e.g., General Packet Radio Service (GPRS), Cellular Data Packet Data (CDPD), Code Division Multiple Access (CDMA), and Time Division Multiple Access (TDMA). In other embodiments, the communications interface 142 may comprise a short-range wireless interface using a short-range wireless protocol such as, e.g., IEEE 802.11 (WiFi), IEEE 802.15 (Bluetooth), and IrDA, as well as other types of RF transmissions, such as on the 900 MHz and 2.4 GHz frequencies. The short-range wireless interface may be provided for communicating with a base station receiver (not shown), which, in turn, is coupled to the wide-area network 162 for communication with the host system 160. The base station receiver may be used to provide wide-area network connectivity for a plurality of vending machine systems, which communicate with the base station receiver via the short-range wireless interfaces. This can serve to decrease the cost of the network connectivity provided in each vending machine system.

The host system 160 can communicate with the audit system 140 using a communication protocol, such as, e.g., User Datagram Protocol (UDP), File Transfer Protocol (FTP), Transmission Control Protocol (TCP), or the like, as would be understood by one of ordinary skill in the art.

The audit system 140 is configured to collect operational data from the VMC 110. This operational data may comprise information regarding sales (e.g., a coil name, unit price, cumulative sales total, and cumulative cash total), cash collection (e.g., "cash in": total cash inserted into the vending machine; "cash out": total cash output by the vending machine as change; "bills to stacker": total bills that are in the bill stacker; "coin to box": total coins that are in the coin box; "tube cash": total cash transferred to the coin tubes; "card cash": total "cashless" monetary value received by the vending machine), temperature, etc. In vending machine systems utilizing the DEX protocol, the audit system 140 collects operational data by requesting a DEX file from the VMC 110.

Under the DEX standard, the VMC generates an audit report file which includes information regarding the operation of the vending machine. This audit report comprises an ASCII text file including a series of lines containing audit information. The audit report also includes a header, a trailer, and a redundancy check, such as a checksum. Each line in the audit report file begins with an identifier, such as ID1, CA2, CA3, etc. The identifier identifies the type of data the line will provide. Each data field in each line is delimited by an asterisk (*). The DEX standard also provides a standard by which the VMC can receive DEX files from an audit system.

The audit system 140 stores a set of data collection parameters which are the settings which govern the collection of operational data by the audit system 140. In the illustrated embodiment, the audit control system 150 is configured to interrogate the VMC 110 to request predetermined types of operational data. This interrogation occurs on a predetermined interrogation schedule. For example, the audit control system 150 may be configured to interrogate the VMC 110 to retrieve "cash in" and sales information every 10 minutes.

In order to transmit operational information regarding the vending machine system 100, the audit system 140 is configured to transmit reports to the host system 160 via the network 162. In accordance with some embodiments, the audit system 140 transmits three types reports: scheduled reports, alert reports, and on demand reports.

The scheduled reports provide a predetermined set of operational data to the host system 160 on a scheduled, periodic basis. The scheduled reports may include operational data retrieved from a plurality of interrogations. For example, the audit control system 150 may be configured to transmit a sales report once per day. This sales report would include the operational data collected from all the DEX interrogations over the previous 24 hours.

The alert reports provide a predetermined set of operational data in response to the detection of an alert condition in the vending machine system 100. The audit control system 150 may be configured to immediately transmit one or more alert reports in response to detection of various alert conditions. For example, if the temperature sensor 132 detects that the temperature within the vending machine system 100 has passed beyond a predetermined acceptable range of temperatures, the audit control system 150 will immediately transmit a temperature alert informing the host system 160 of the situation. The audit control system 150 may also be configured to transmit a door alert if the door sensor 130 detects that the access door 122 has been opened.

The on demand reports provide a set of operational data in response to receipt of a request for that data from the host system. For example, the host system may transmit a query to the audit control system 150 requesting the current amount of cash available. If the audit control system 150 already has the requested data in the data memory 156, the audit control system 150 will immediately respond to the host system 160 with the requested data. If the data is not available, then the audit control system 150 will request the data from the appropriate device, such as, e.g., the VMC 110, and then will transmit that data to the requesting host system.

In accordance with embodiments of the present invention, the audit system 140 is configured to receive control data from the host system 160 via the wide area network 162. This control data enables the host system 160 to remotely control various aspects regarding the operation of the vending machine system 100, as will be described in greater detail below.

Figure 3:
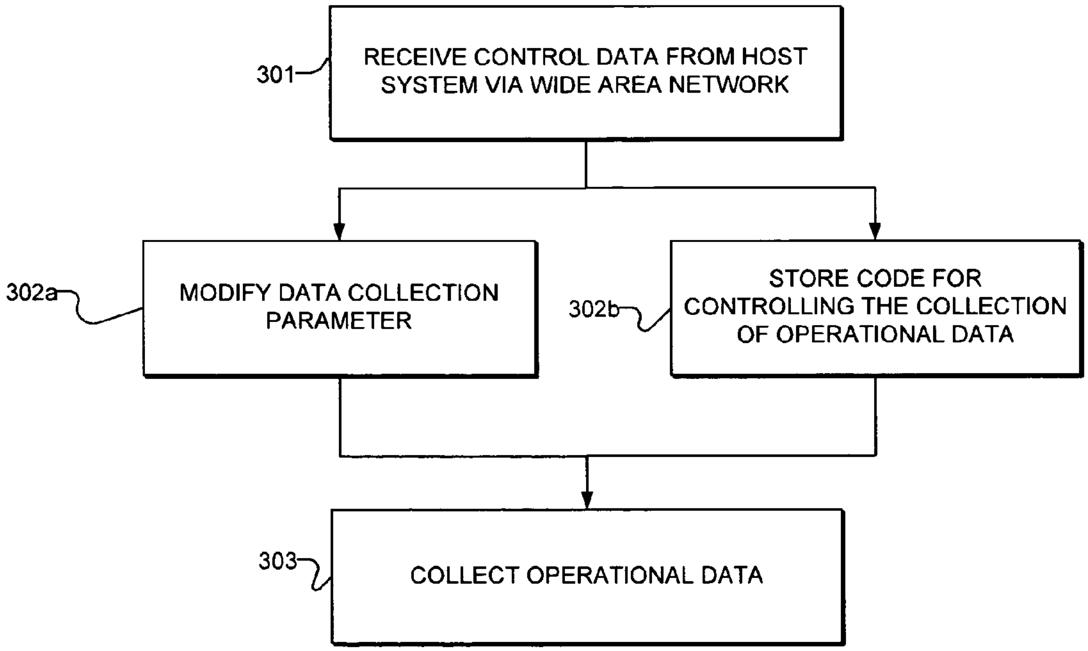
FIG. 3 is a flowchart illustrating a remote control process for a vending machine system, in accordance with embodiments of the present invention.

FIG. 3 is a flowchart showing a method of remotely controlling a vending machine system, in accordance with embodiments of the present invention. In step 301, control data is received from the host system 160 via the wide area network 162. In response to receiving this control data, the method may proceed to step 302*a*, in which a data collection parameter is modified pursuant to the instructions contained in the control data. Alternatively, the method may proceed to step 302*b*, in which code for controlling the collection of operational data is stored. Finally, in step 303, operational data for the vending machine is collected in accordance with the modified data collection parameter or the new code.

In accordance with some embodiments, the control data from the host system comprises a command to modify a data collection parameter of the audit system. As described above, the audit system 140 stores a set of data collection parameters which govern the collection of operational data by the audit system 140. In the illustrated system 100, these data collection parameters are stored in the EEPROM 154 of the audit control system 150, but could be stored elsewhere in other embodiments. The control data instructs the audit system 140 to modify one of the existing data collection parameters. This would cause the MPU 152 to change the setting stored in the EEPROM 154. In other embodiments, the changes to the data collection parameters are stored elsewhere, such as in the program memory 155 or the data memory 156.

For example, a user may wish to change the reporting schedule from once per day to every four hours. Normally, this would require that an operator visit the location of the vending machine system and couple a portable computing device, such as a PDA or laptop, to the audit system in order to make the change to the data collection parameter. In contrast, the audit system 140 can receive the control data remotely from the host system 160 via the wide-area network 162.

Any of the data collection parameters of the audit system 140 may be modified remotely by the host system 160. For example, the host system 140 may modify the types of alert conditions that result in the transmission of an alert report. This may be useful, for example, in the event of failure of one of the sensors in the vending machine system 100, such as the door sensor 130. Normally, in this situation, if the door sensor 130 has failed in such a way that the audit system 140 believes that the access door 122 is open, the audit system 140 may repeatedly transmit the corresponding "door open" alert report to the host system 160. It may be desirable to temporarily deactivate the "door open" alert condition while arrangements are being made for an operator to visit the vending machine system 100 and repair the failed sensor 130.

Another example of a modification to a data collection parameter is a modification of the types of operational data to be contained in the regularly scheduled reports. For example, if all the products contained in coil 8 have been sold and it has been decided not to restock coil 8, it may be desirable to eliminate the operational data corresponding to coil 8 from the daily reports transmitted to the host system 160. Similarly, it may be desirable to configure the audit control system 150 so that the VMC 110 is no longer interrogated regarding the status of coil 8.

In accordance with embodiments of the present invention, the control data comprises code for execution by the MPU 152 for controlling the collection of operational data. This code may comprise logic for parsing the operational data file received from the VMC 110. For example, the audit control system 150 may be configured to interrogate the VMC 110 to retrieve a DEX report. Although the DEX protocol specifies a standard data format to enable different types of vending machines to communicate electronically, the content of the data may vary depending on the manufacturer. Typically, the DEX information includes: sales, cash collections, product movement, and other vending machine activities. In addition, the DEX specification contains the standard for reporting error codes for payment validation, mechanical failures, and other operational problems. The format of the DEX report provided in response to interrogation by the audit system is ostensibly governed by the DEX standard. However, many vending machine manufacturers do not strictly comply with the documented DEX standard and may format their DEX reports in a proprietary fashion. As a result, third-party audit systems may not be able to properly communicate with the noncompliant VMC 110 and may not be able to obtain the desired operational data. The new code received from the host system 160 may enable the audit control system 150 to retrieve the desired data from the proper location within the DEX file retrieved from the VMC 110.

When audit systems are retrofitted to existing vending machine systems, it may not be immediately apparent that such a potential communication problem exists. Thus, it would be desirable to be able to correct these problems remotely by transmitting new code to be stored in the program memory 155 of the audit control system 150. This new code will enable the audit control system 150 to retrieve the desired operational data from the noncompliant DEX report. The correction of these communication problems can be performed long after the service personnel has left the location of the vending machine.

In accordance with other embodiments of the present invention, the control data from the host system comprises a status code management list. This status code management list can be used by an audit system to more effectively monitor for and report status codes received from the VMC to the host system. These status codes may be referred to as "error" codes, but may report any of a variety of status events and are not necessarily limited to reporting errors or failures.

Under the DEX standard, VMCs may be configured to insert error codes in the DEX file. This enables the VMC to report events by specifying the type of event and the time of occurrence. Although the DEX standard defines a general format for communicating these error codes, the precise format and the types of codes used by VMCs is not defined and typically varies widely amongst different vending machine manufacturers. As a result, retrofit audit systems may not be capable of recognizing the error codes for any given vending machine in which the audit system is installed. Accordingly, it may be desirable to provide an audit system with a status code management list in order to enable the audit system to interpret the error codes received in the DEX files from the VMC.

By enabling the audit system to recognize the error codes from the VMC, the audit system may be able to intelligently respond to these error codes. For example, the audit system may be configured such that if a particular error code (e.g., an error code indicating that the access door is open) is received, the audit system will immediately report this error code to the host system. However, if a lower priority error code is received, this error code may only be reported in the next regularly scheduled audit report or may be disregarded altogether.

The audit system 140 may be configured to receive control data from the host system comprising a status code management list. This status code management list may be implemented as a filter which can be utilized by the audit system to identify and report a predefined list of status codes. The status code management list may also be used to prioritize and/or disregard certain types of status codes.

FIGS. 4A-4C show exemplary tables used for managing status code management lists, in accordance with embodiments of the present invention. FIG. 4A shows a partial Machine Type list that could be maintained at the host system 160. This Machine Type list includes entries for each of the types of vending machine systems into which the audit systems 140 managed by the host system 160 are installed. Each entry may include an Error Code Set identifier field, which identifies the status code management list that should be utilized by an audit system 140 installed into that type of vending machine system.

FIG. 4B shows a partial Error Code Device Watch List, which may comprise the control data transferred to the audit system 140 by the host system 160 as part of the Error Code Set 1002. The Watch List provides filter terms that are applied by the audit system 140 when parsing the DEX files received from the VMC 110. The audit system 140 may search for these filter terms either at the beginning of a DEX file entry, at the end of a DEX file entry, or anywhere in the DEX file. As defined by the Error Code Device Watch List, when the audit system 140 detects one of the filter terms, the audit system 140 may either selectively ignore or retrieve the corresponding status message. For example, the first entry in the Watch List is a BeginsWith filter term of EA2*HSMP. When the audit system 140 parses a DEX file and detects a status message beginning with EA2*HSMP, the audit system 140 will retrieve the entire line of the status message and report it to the host system 160.

FIG. 4C shows a partial Error Code Translations table that may be stored at the host system 160 for use by human operators to interpret status messages received from the audit system 140. This Translations table include a textual description of the status event that caused the VMC 110 to generate the corresponding error code.

When an audit system 140 is installed into a vending machine system 100 and booted for the first type, the audit system 140 will retrieve a full DEX file from the VMC 110, which includes a vending machine identifier number. This full DEX file is transmitted to the host system 160, where the MachineType table in FIG. 4A is used to match the vending machine system 100 with the appropriate ErrorCodeSet identifier. This matching can be performed automatically by the host system 160 or may be performed manually by a human operator. The set of filter terms corresponding that the appropriate ErrorCodeSet identifier is transmitted to the audit system 140 via the WAN 162. These filter terms can be stored in the memory of the audit control system 150 (e.g., in program memory 155) and are utilized by the audit control system 150 to parse DEX files received from the VMC 110 in the future.

The application of the filter terms to the DEX file can help to reduce the amount of data transmitted by the audit system 140 to the host system 160, thereby reducing data transmission costs. The operator at the host system 160 is able to configure the audit system 140 to selectively report status messages to the host system 160.

In accordance with some embodiments, the audit system 140 may be configured to transmit a status code management list confirmation to the host system 160. This allows the host system 160 to confirm that the audit system 140 has the more up-to-date status code management list available. Because the status code management list may include a large number of filter terms to apply to the DEX file, the list may be quite long, making it impractical to transmit the entire list over the WAN 162. In one embodiment, an error detection code may be transmitted to the host system 160 instead of the status code management list. This error detection code may comprise, e.g., a checksum or a cyclic redundancy check (CRC) of the status code management list. The host system 160 stores an error detection code corresponding to the known up-to-date status code management list. If the error detection code received from the audit device 140 does not match the error detection code on the host system 160, then the audit device 140 does not have the correct status code management list. Therefore, the host system 160 may transmit the correct list for implementation by the audit system 140.

In accordance with other embodiments of the present invention, the control data from the host system comprises a DEX file to be transferred to the VMC 110. The DEX standard includes an option for vending machine controllers to receive DEX files, in addition to generating DEX files. These DEX files may include control data used by the VMC to configure the operation of the vending machine system. For example, this DEX file may be used to set pricing for the products or to set the configuration of coils in the product storage region 102.

In accordance with other embodiments of the present invention, the control data from the host system comprises code for execution by the audit system 140 to enable the audit system 140 to interface with a device contained in the vending machine system 100. This may be particularly desirable in order to provide an audit system 140 with additional functionality not provided when the audit system 140 was initially installed in the vending machine system 100.

For example, a new peripheral, such as, e.g., a display screen for displaying advertisements, may be made available to vending machine operators. Existing audit systems 140 already installed in the field include the peripheral interface 214 which could be used to attach new peripherals. However, the audit control systems 150 for these existing systems are not programmed to communicate with the new peripheral until the new code is received from the host system 160 and installed in the program memory 155. The administrator of the host system 160 may wish to install this new code on all of the audit systems 140 on the network in preparation for potential installation of this new peripheral. Thus, the new peripheral could be essentially "plug-and-play", such that the peripherals need only be installed into the vending machine system 100 and connected to the audit system 140 in order to become operable. No new software would be necessary at the time of installation.

Embodiments of the present invention may enable a vending machine operator to remotely make changes to data collection parameters and to the code executed by the audit system for collecting operational data. This can decrease the frequency of service visits by technicians and can eliminate the need for highly-skilled technicians to visit the vending machine in order to configure the system and to install new software code.

While the invention has been described in terms of particular embodiments and illustrative figures, those of ordinary skill in the art will recognize that the invention is not limited to the embodiments or figures described. For example, in many of the embodiments described above, the audit system is installed in a vending machine system having a product storage region comprising a plurality of coils. It will be understood that the vending machine system may comprise any type of point-of-sale device including cash registers and the like, and need not be limited to only those devices that deliver tangible products to customers.

In addition, the audit system described above communicates with the VMC according to the DEX protocol. In other embodiments, different types of communication protocols may be used. For example, the audit system may utilize the European Vending Association Data Transfer Standard (EVA DTS), which is a protocol similar to the DEX standard for governing the storage and transfer of vending machine data.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of operating a vending machine system comprising a remote management system, a plurality of vending machine controllers (VMCs) and a plurality of audit systems connected to the remote management system by a wide area network, the method comprising:

at a selected one of the audit control systems, receiving control data from the remote management system via the wide area network, wherein the control data comprises a command to modify a data collection parameter of the selected audit control system; and in response to the command, modifying the data collection parameter of the selected audit system; and using the selected audit system to collect data from one or more of the VMCs over a bidirectional data communication interface according to the modified data collection parameter;

transmitting by a selected one of the plurality of audit systems an error detection code comprising a checksum representing a status of a status code management list to a host system coupled to the remote management system to detect if an updated status code management list is present in the audit system; and updating the status code management list with a status code management list in the host system when there is a mismatch between the checksum and a checksum stored in the host system.

2. The method of claim 1, wherein the selected audit system is configured to communicate with the VMC via a DEX interface.

3. The method of claim 1, wherein the selected audit system is configured to respond to detection of one of a plurality of predetermined alert conditions by transmitting a report corresponding to that alert condition; and said modifying the data collection parameter changes one of the predetermined alert conditions.

4. The method of claim 3, wherein said modifying the data collection parameter comprises adding an alert condition to the plurality of predetermined alert conditions or deleting an alert condition from the plurality of predetermined alert conditions.

5. The method of claim 3, wherein said modifying the data collection parameter comprises modifying information contained in the report transmitted in response to one of the plurality of alert conditions.

6. The method of claim 1, wherein the selected audit system is configured to transmit a report to the remote management system according to a reporting schedule; and said modifying the data collection parameter comprises modifying the reporting schedule.

7. The method of claim 1, wherein the selected audit system is configured to transmit a report to the remote management system, said report comprising a plurality of types of operational data; and said modifying the data collection parameter comprises modifying the plurality of types of operational data contained in the report.

8. The method of claim 1, wherein the selected audit system is configured to interrogate the selected VMC according to an interrogation schedule; and said modifying the data collection parameter comprises modifying the interrogation schedule.

9. The method of claim 8, wherein said interrogation comprises requesting sales data from the selected VMC.

10. The method of claim 1, wherein said selected audit system is configured to retrieve an operational data file from the selected VMC; and said data collection parameter comprises logic for parsing the operational data file and for generating a report to be transmitted to the remote management system.

11. The method of claim 10, wherein said parsing comprises selecting predetermined fields from the operational data file to be included in the report transmitted to the remote management system.

12. The method of claim 11, wherein said report comprises data recorded from the selected predetermined fields.

13. The method of claim 10, wherein said parsing comprises searching for a predetermined string of characters in the operational file from the selected VMC.

14. A method of operating a vending machine system comprising a remote management system, a plurality of vending machine controllers (VMCs) and a plurality of audit systems connected to the remote management system by a wide area network, the method comprising:

receiving control data from the remote management system via the wide area network, wherein the control data comprises code for execution by a selected one of the audit systems to interface with a selected one of the VMCs over a bidirectional data communication interface; and storing the code in a nonvolatile memory of the selected audit system;

transmitting by a selected one of the plurality of audit systems an error detection code comprising a checksum representing a status of a status code management list to a host system coupled to the remote management system to detect if an updated status code management list is present in the audit system; and updating the status code management list with a status code management list in the host system when there is a mismatch between the checksum and a checksum stored in the host system.

15. The method of claim 14, wherein said code comprises code for interfacing the selected audit system to a peripheral device not previously operating in the vending machine system.

16. The method of claim 15, further comprising installing the peripheral device in the vending machine system.

17. The method of claim 14, wherein said device being installed in a selected one of the VMCs; and said code comprises code for retrieving data from the selected VMC using the selected audit system.

18. In a vending machine system comprising a remote management system, a plurality of vending machine controllers (VMCs) and a plurality of audit systems connected to the remote management system by a wide area network, an audit system comprising:

a communications interface for receiving data over the wide area network; and an audit control system configured to receive control data from the remote management system over the communications interface, wherein the control data comprises a command to modify a data collection parameter of the audit system, said audit control system being configured to collect data over a bidirectional data communication interface from a selected one of the VMCs according to the modified data collection parameter; and further configured to transmit an error detection code comprising a checksum representing a status of a status code management list to a host system coupled to the remote management system to detect if an updated status code management list is present in the audit control system; and configured to update the status code management list with a status code management list in the host system when there is a mismatch between the checksum and a checksum stored in the host system.

19. The system of claim 18, wherein the audit control system is configured to communicate with the selected VMC via a DEX interface.

20. The system of claim 18, wherein said audit control system is configured to respond to detection of one of a plurality of predetermined alert conditions by transmitting a report corresponding to that alert condition, and is configured to modify the data collection parameter by changing the predetermined alert conditions.

21. The system of claim 20, wherein said audit control system is configured to change the predetermined alert conditions by adding an alert condition to the plurality of predetermined alert conditions or deleting an alert condition from the plurality of predetermined alert conditions.

22. The system of claim 20, wherein said predetermined alert conditions comprises information contained in the report transmitted in response to one of the plurality of alert conditions.

23. The system of claim 18, wherein the audit system is configured to transmit a report to the host system according to a reporting schedule; and the data collection parameter comprises the reporting schedule.

24. The system of claim 18, wherein the audit system is configured to transmit a report to the host system, said report comprising a plurality of types of operational data; and said data collection parameter comprises the plurality of types of operational data contained in the report.

25. The system of claim 18, wherein the audit system is configured to interrogate the VMC according to an interrogation schedule; and said data collection parameter comprises the interrogation schedule.

26. The system of claim 25, wherein said audit system is configured to interrogate the selected VMC by requesting sales data from the selected VMC.

27. The system of claim 18, wherein said audit system is configured to retrieve an operational data file from the selected VMC; and said data collection parameter comprises logic for parsing the operational data file and for generating a report to be transmitted to the host system.

28. The system of claim 27, wherein said parsing comprises selecting predetermined fields from the operational data file to be included in the report transmitted to the host system.

29. The system of claim 28, wherein said report comprises data recorded from the selected predetermined fields.

30. The system of claim 27, wherein said parsing comprises searching for a predetermined string of characters in the operational file from the selected VMC.

* * * * *